US008813795B2

(12) United States Patent
Untch (10) Patent No.: US 8,813,795 B2
(45) Date of Patent: Aug. 26, 2014

(54) PASSIVE VALVE FOR MULTIVALVE DEVICES AND A MULTIVALVE DEVICE, IN PARTICULAR HAVING SUCH A PASSIVE VALVE

(75) Inventor: Guenter Untch, Muellheim (DE)

(73) Assignee: Andocksysteme G. UNTCH GmbH, Badenweiler (DE)

( * ) Notice: Subject to any disclaimer, the term of this patent is extended or adjusted under 35 U.S.C. 154(b) by 193 days.

(21) Appl. No.: 13/236,051

(22) Filed: Sep. 19, 2011

(65) Prior Publication Data

US 2012/0074341 A1 Mar. 29, 2012

(30) Foreign Application Priority Data

Sep. 24, 2010 (DE) .......................... 10 2010 041 383
Jan. 24, 2011 (DE) .......................... 10 2011 009 303

(51) Int. Cl.
| | | |
|---|---|---|
| *B65B 1/04* | (2006.01) | |
| *B65B 3/00* | (2006.01) | |
| *B67C 3/00* | (2006.01) | |
| *E03B 1/00* | (2006.01) | |
| *F16L 37/36* | (2006.01) | |
| *F16L 37/367* | (2006.01) | |
| *F16K 1/20* | (2006.01) | |
| *F16K 31/00* | (2006.01) | |
| *F16K 51/00* | (2006.01) | |
| *F16K 29/00* | (2006.01) | |
| *F16K 27/02* | (2006.01) | |
| *B65G 69/18* | (2006.01) | |
| *F16K 1/22* | (2006.01) | |
| *B65D 90/62* | (2006.01) | |

(52) U.S. Cl.
CPC .......... *B65G 69/183* (2013.01); *F16K 27/0218* (2013.01); *B65D 90/623* (2013.01); *F16K 1/224* (2013.01)
USPC ................. 141/383; 137/614.06; 137/614.01; 137/614.11; 251/128; 251/144; 251/152; 141/346

(58) Field of Classification Search
CPC ....... F16K 27/0218; F16K 1/22; F16K 1/223; F16K 1/224; B65G 69/183; F16L 37/30
USPC ......... 141/346, 348–354, 383–386, 369–381; 251/128, 149.9, 144, 145–146, 251/148–152, 292, 304–306, 308, 367, 251/368; 137/613, 614, 614.01, 614.06, 137/614.11, 315.17, 315.22, 315.24, 572
See application file for complete search history.

(56) References Cited

U.S. PATENT DOCUMENTS 7,552,710 B2 *  6/2009  Lancioni et al. ............... 123/336

FOREIGN PATENT DOCUMENTS

| CH | 695425 | 5/2006 |
|---|---|---|
| DE | 69321376 | 4/1999 |

(Continued)

OTHER PUBLICATIONS

Office Action, DE 10 2011 009 303.6 mailed Jun. 28, 2011, (7 pages—German; 4 pages—English).

(Continued)

*Primary Examiner* — John K Fristoe, Jr.
*Assistant Examiner* — Hailey K Do
(74) *Attorney, Agent, or Firm* — Andrew F. Young, Esq.; Lackenbach Siegel, LLP (57) ABSTRACT

The invention relates to a passive valve for multi-valve devices for sealing a container or a line. According to one aspect of the invention, the passive valve is free of bearing supports which protrude in a positive sense out of the passive valve. The invention also relates to a multi-valve device for contamination-free connection of two containers or two lines with partial valves that can be rotated about a single axis. According to this aspect of the invention, at least three partial valves, which are arranged essentially parallel to one another and can be put under tension so they can be sealed with respect to their surroundings, can be rotated about the single shared axis.

11 Claims, 6 Drawing Sheets

(56) References Cited

FOREIGN PATENT DOCUMENTS

| | | |
|---|---|---|
| DE | 60205982 | 6/2006 |
| DE | 102007 050 077 | 4/2009 |
| DE | 10 2009 025 290 | 12/2010 |
| EP | 1213244 | 6/2002 |
| EP | 1 550 833 | 12/2004 |
| EP | 1 749 770 | 7/2006 |
| EP | 2 179 949 | 9/2009 |
| WO | WO 2008/071181 | 6/2008 |

OTHER PUBLICATIONS

EPC Pat. Appln. S.N. EP 11 18 1882 Search Report mailed Dec. 27, 2011, 7 pages (5 pages—German, 2 pages—English translation).

* cited by examiner

PASSIVE VALVE FOR MULTIVALVE DEVICES AND A MULTIVALVE DEVICE, IN PARTICULAR HAVING SUCH A PASSIVE VALVE

CROSS-REFERENCE TO RELATED APPLICATIONS

This application claims priority to DE 10 2010 041 383.6 filed Sep. 24, 2010 and to DE 10 2011 009 303.6 filed Jan. 24, 2011, the entire contents of each of which are herein incorporated fully by reference.

FIGURE SELECTED FOR PUBLICATION

FIG. 3

BACKGROUND OF THE INVENTION

1. Field of the Invention

The present invention relates to passive valve for multi-valve devices for sealing a container or a line as well as a multi-valve device for a contamination-free connection of two drums or two lines, in particular having partial valves rotatable about a single axis. More particularly, the present invention provides a passive valve designed to be free of bearing supports protruding positively out of the passive valve.

2. Description of the Related Art

Generic multi-valve devices are employed in the field of contamination-free docking systems for methods and systems for sensitive and/or toxic solids, primarily in the pharmaceutical industry. A double valve technology for use on rigid drums and a flexible half closure for another application to flexible drums have become established as technologies for docking a drum onto a process unit or docking a line onto a drum or docking line onto another line or undocking them therefrom. These drums are also subsumed under the term "container" in this patent application.

Known double-valve or half-valve systems consist of two half valves. Each half valve tightly closes a drum. After docking and the associated operation of connecting to a second half valve, both half valves can then be rotated about a common axis for the transfer of product from a first drum into a second drum. The known systems also typically consist of an active half valve, usually mounted permanently on installations, and a passive half valve, usually mounted on mobile drums. The active half valve can be controlled for rotation while the second half valve is entrained.

One disadvantage of the known double-valve systems is that direct docking of mobile drums with their respective passive half valves onto one another is impossible because in this case there is no control of the rotation. A complex docking mechanism consisting of two active valves mounted back-to-back is necessary in such known systems to be able to implement this, which is encountered frequently.

According to an alternative apparatus known in the art for docking two passive half valves, for example, according to EP 1 947 039 A1, passive half valves are docked by means of a drive ring arranged between the passive half valves and are then opened. Docking of drums onto one another while maintaining zone separation in the docked state of the drums is impossible with such an existing apparatus. The zone separation would be necessary in the case of discharge from an insulated container, for example, or in factories in which the material is conveyed by means of gravity through various floors, for example, where the floors are each assigned to different spatial zones. Zone separation in this sense means that a partition, for example, a ceiling passage, is completely closed between two different zones even when drums and/or process units are not docked there, and thus the zone separation is further ensured.

Further, the drive ring according to EP 1 947 039 A1, the contents of which are incorporated herein by reference, forms an interspace between the passive valves between the zones and is a weak point from the standpoint of freedom from contamination. The interspace may become contaminated and/or may itself contaminate the surroundings as soon as a passive valve is removed. Furthermore, because of the known force induction technology, a half valve made entirely of plastic cannot be implemented for such drive rings having a drive fin. The high required torque, which is input via the drive fin, would deform the half shafts of the passive valves. These half shafts are required as bearing supports after a very short period of time and would thus make them unusable.

However, the demand for half valves made entirely of plastic persists for applications in which the weight of the respective half valve plays a major role and/or in which plastic half valves on plastic containers are even being considered for disposable use. The problems of known multi-valve devices explained above form the basis of the present invention with the goal of overcoming their disadvantages.

These problems are at least partially solved by a passive valve for multi-valve devices for sealing a container or a line as well as a multi-valve device for a contamination-free connection of two drums or two lines, in particular having partial valves rotatable about a single axis, or a passive valve designed to be free of bearing supports protruding positively out of the passive valve.

ASPECTS AND SUMMARY OF THE INVENTION

The present invention relates to a passive valve for multi-valve devices for sealing a container or a line. According to one aspect of the invention, the passive valve is free of bearing supports which protrude in a positive sense out of the passive valve. The present invention also relates to a multi-valve device for contamination-free connection of two containers or two lines with partial valves that can be rotated about a single axis. According to this aspect of the invention, at least three partial valves, which are arranged essentially parallel to one another and can be put under tension so they can be sealed with respect to their surroundings, can be rotated about the single shared axis. Such passive valves also permit an embodiment without a true active valve but instead with a tool that can be inserted between the passive valves.

The present invention is based on the idea of implementing a docking mechanism consisting of three one-third valves or even multiple partial valves, which can be rotated about a single shared axis, instead of implementing a docking mechanism consisting of only two half valves. The third and/or partial valves lie in flat contact with one another, so that no interspaces remain unfilled and can become contaminated or cause contamination themselves. The present invention now presents the use mentioned first in the field of double valves, also known as half valves, depending on the point of view, and opens up previously impossible application areas with a new technology step.

The passive valve for multi-valve devices according to the invention is suitable for sealing a container or a line. The passive valve is arranged in a housing so that it is rotatable about an axis and the housing is in turn tightly connected to the container or the pipe. Corresponding openings in the container or line may also be designed in the housing. In a closed position, the container or the line is sealed around the complete circumference by means of the passive valve. In an open position, the passive valve allows the fluid medium to flow in at least one direction of flow.

According to the invention, the passive valve is designed to be free of bearing supports protruding in a positive sense out of the passive valve. The inventive passive valve does not have any partial shaft journals, such as those which would be necessary with known multi-valve devices. A rotatable receptacle in the housing is proposed, allowing use of other materials, in particular plastic, for the passive valve. Less expensive passive valves have thus been proposed here. The passive valves may be used in conventional dual valve devices and in novel triple valve devices such as those which are also the subject matter of the present patent application.

According to an advantageous embodiment of the passive valve, at least two opposing bearing grooves along the axis are embodied as semicircular curves around the axis. The bearing grooves are recessed in the passive valve in a negative sense.

According to another advantageous embodiment of the passive valve, a longitudinal groove extends along the axis and beyond an interfacial surface of the passive valve that can be turned away from the container or the line. A tool which transfers the rotational motion of the passive valve can be inserted into the longitudinal groove in such a way that conforms to the contour.

According to yet another advantageous embodiment of the passive valve, a countersunk region extending as far as a sealing face which terminates the interfacial surface on the outside radially is arranged centrally in an interfacial area that can be turned away from the container or the line, so that a cavity is formed between the passive valve and another valve. Such a cavity is formed not because of the tool to be inserted but instead is formed between the passive valves which nevertheless seal one another directly with sealing surfaces which run almost completely around the periphery.

In the case of multi-valve devices such as those according to the present invention, a passive partial valve or the passive valve, which corresponds in principle to conventional half valves, is mounted on the drum, the container, the line and/or the process unit.

In one of the inventive multi-valve devices having three valves according to the invention, the interfacial surface of the respective partial valve designed as a passive valve, said interfacial surface being directed outward away from the drum and/or process unit does not extend up to a plane in which the axis is situated, in deviation from known half valves. The respective interfacial surface is set back a few millimeters in parallel with the axis in comparison with a plane aligned perpendicular to the direction of flow. The passive partial valves are referred to below as first and third partial valves.

The first and third partial valves are advantageously each a plate construction having a nominal diameter, which does not extend beyond the nominal diameter comprising a plate support. Each partial valve has a plate that corresponds to a cross section of a pipe to be sealed. In comparison with the conventional half valves according to advantageous embodiments of the invention, the plates of the plate construction do not have a shaft, a shaft journal or pin. The manufacture of the partial valves designed as passive valves can in the meantime be implemented much less expensively than is the case with known passive valves.

According to still another advantageous embodiment of the invention, an additional second partial valve, which is designed as a completely self-sealing active valve that appears to be almost completely traditional, forms part of a drive unit for the entire multi-valve configuration. The respective passive partial valves described above can be docked on the second partial valve from both sides. After docking, all the partial valves may be rotated about the shared axis.

Three or more third valves or partial valves rotating about one axis require bearings for all valves, which must be coordinated very precisely with one another in order to allow a joint rotation. In the docked state, this second partial valve can then maintain the zone separation described in the introduction because of its inherent imperviousness, whereas the drums move in different zones. In the docked position, a transfer of granular product material in the direction of flow, for example, can be implemented, while completely maintaining this zone separation and with no risk of contamination at all, because after the partial valves are closed, the first and/or third partial valves can be undocked from the second partial valve without exposing a contaminated surface. The induction of force to open and close the partial valves always takes place via solid plate surfaces, which readily allows a use of plastics for the first and third partial valves.

Another aspect of the passive valves according to the invention is the secured locking of these valves in the undocked state, so that uncontrolled opening can be prevented reliably. With known systems, this is implemented with metallic locking pins. In order to implement this aspect as simply as possible without using these metallic pins, the present invention provides for a passive housing of the respective passive valve to be designed as a two-component injection molded plastic part, which holds the valve plate in position in the undocked state, as is done with a collet, for example. The core of the passive housing, which is made of a solid plastic and resembles a spreading mandrel, is completely sheathed with an elastomer and thus constitutes a finished sealing housing.

In the docking process, in locking the advantageously designed passive housing to an active housing, the respective passive housing is spread by a conical mating contour in the second partial valve. When the passive housing is spread apart, this exposes the passive partial valve for switching from the closed position to the open position. The required opening torque can therefore be reduced significantly in comparison with conventional valves. The spreading mandrel principle requires an accurate matching of locking force to the undocked partial valves and unlocking force in the docking process in order to ensure reliable functioning.

The three-valve system allows additional interesting applications. For example, only one drum or one process unit can be easily docked, opened and emptied on one side of the second partial valve without product contamination of the outwardly directed surface of the passive valve on the drum or the process unit. Likewise, the active second partial valve may be designed as a washing valve, in which case the second partial valve has integrated washing nozzles, which allow cleaning of third valves in the docked opened state.

In this washing process, either two docked drums or two process units may also be washed together with one another, or just one docked drum or one process unit may be washed if a washing adapter is docked, e.g., as a drain container instead of the third partial valve.

Advantages of the inventive multi-valve device thus include, the possibility of docking drums/process units with only passive partial valves each, while completely retaining the zone separation, as well as the availability of passive partial valves made entirely of plastic due to optimal torque input and the spreading mandrel locking principle. These advantages permit a connection between flexible disposable drums and rigid stainless steel components and a connecting element is created. For the first time, a multi-valve device having passive valves that can be manufactured inexpensively allows docking of mobile drums or lines onto one another, such that the robustness of the valve technology offers advantages with regard to stability. Nevertheless, a passive valve according to the invention may even be considered to be a disposable component because of the simple design and being made entirely of plastic. As a result, highly flexible applications with the option of opening and emptying of a drum/process unit which is merely docked or unit, while retaining the freedom from contamination of the drum/process valve have been developed.

The above and other aspects, features and advantages of the present invention will become apparent from the following description read in conjunction with the accompanying drawings, in which like reference numerals designate the same elements.

BRIEF DESCRIPTION OF THE DRAWINGS

A further understanding of the present invention can be obtained by reference to a preferred embodiment set forth in the illustrations of the accompanying drawings. Although the illustrated preferred embodiment is merely exemplary of methods, structures and compositions for carrying out the present invention, both the organization and method of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the present invention, reference is now made to the following drawings in which.

DETAILED DESCRIPTION OF THE PREFERRED EMBODIMENTS

As required, a detailed illustrative embodiment of the present invention is disclosed herein. However, techniques, systems, compositions and operating structures in accordance with the present invention may be embodied in a wide variety of sizes, shapes, forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein which define the scope of the present invention.

Reference will now be made in detail to several embodiments of the invention that are illustrated in the accompanying drawings. Wherever possible, same or similar reference numerals are used in the drawings and the description to refer to the same or like parts or steps. For the sake of a better overview, not all reference numerals have been entered into all figures. The drawings are in simplified form and are not to precise scale.

Figure 8:
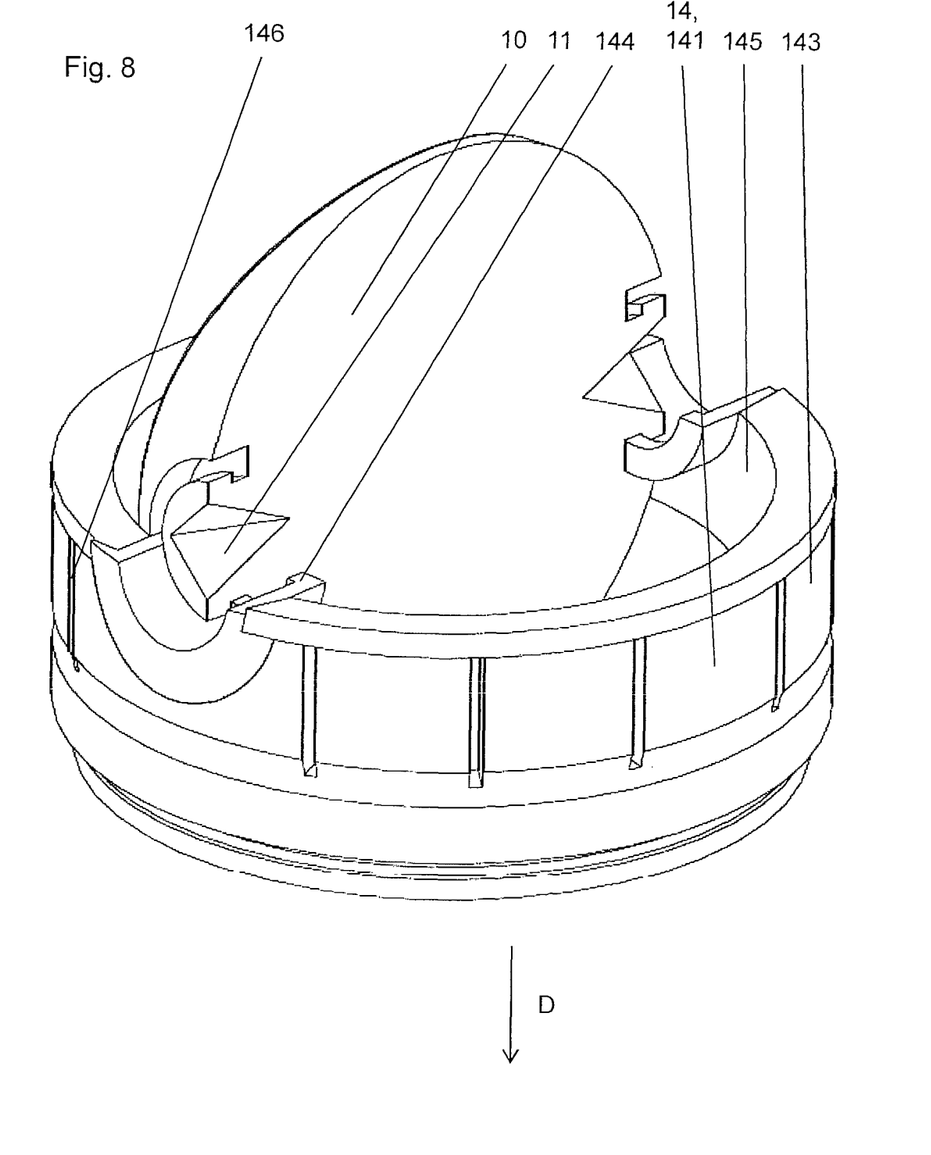
FIG. 8 shows a perspective view of a passive partial valve with a passive housing of the multi-valve device in the open position as shown in FIG. 2 in an exploded diagram without any other partial valves.

FIGS. 1 through 8 show an exemplary embodiment of an inventive multi-valve device for a contamination-free connection of two drums or two lines. FIG. 8 only shows a passive valve with a passive housing while additional components of the multi-valve device are not shown in FIG. 8.

Figure 1:
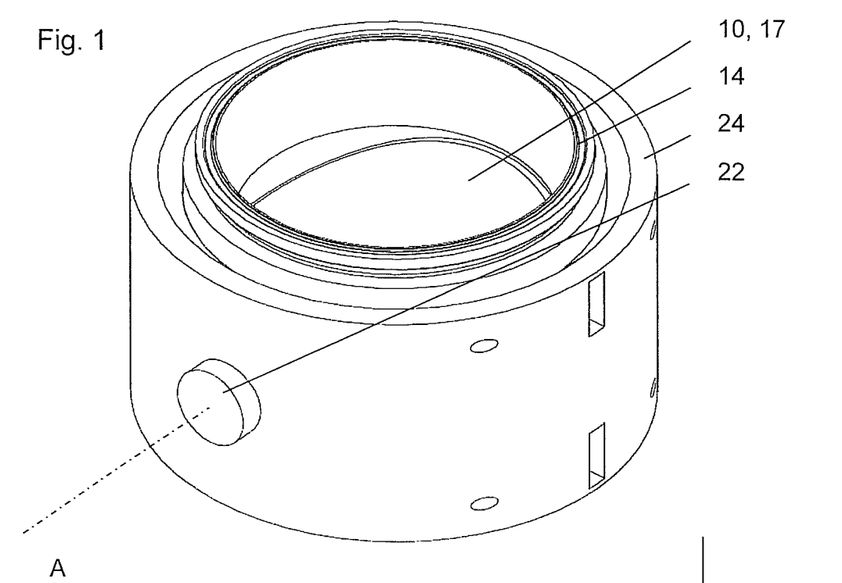
FIG. 1 shows a perspective view of a multi-valve device according to one exemplary embodiment of the present invention with the device in a closed position.
Figure 2:
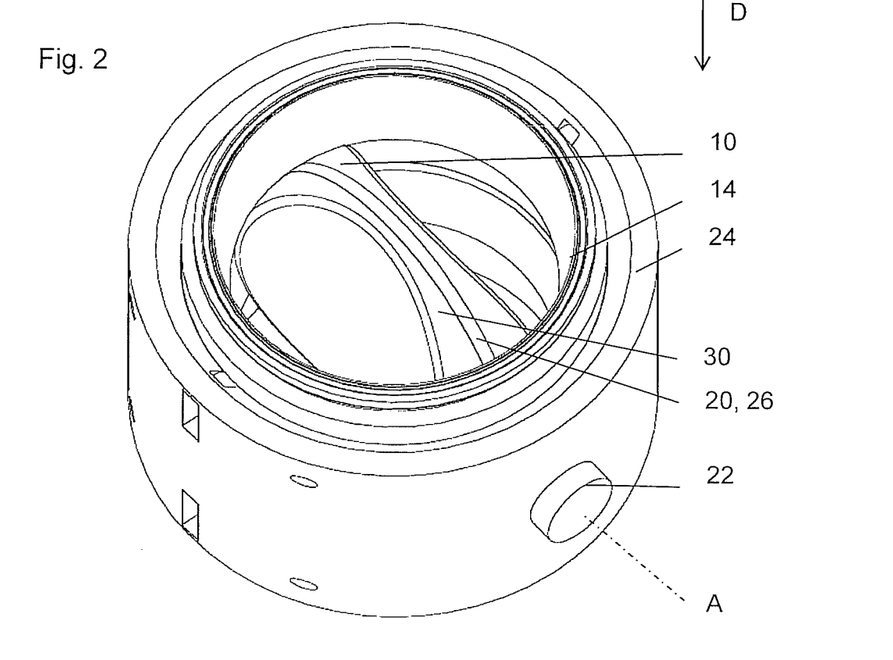
FIG. 2 shows another perspective view of the multi-valve device shown in FIG. 1 but with the device in an open position.

FIGS. 1 and 2 show the multi-valve device according to the present invention in different positions. FIG. 1 shows a closed position and FIG. 2 shows an open position. For switching between the closed position and the open position, partial valves 10, 20, 30 can be rotated about a single axis A. The axis A is perpendicular to a direction of flow D in which material can be directed from the first drum and/or the first line into the second drum and/or the second line through the multi-valve device when the partial valves 10, 20, 30 are rotated into the open position.

Figure 3:
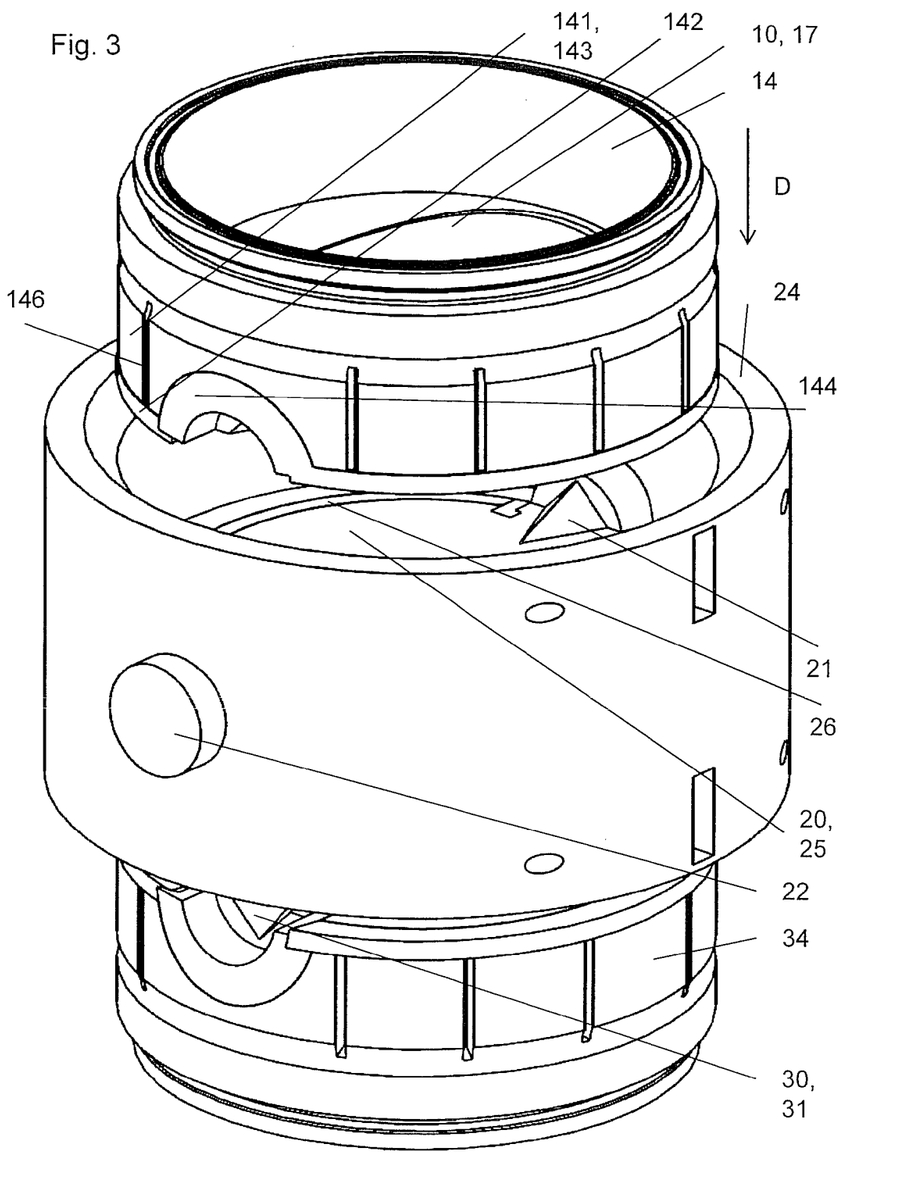
FIG. 3 shows a perspective exploded view of the multi-valve device shown in FIG. 1.
Figure 4:
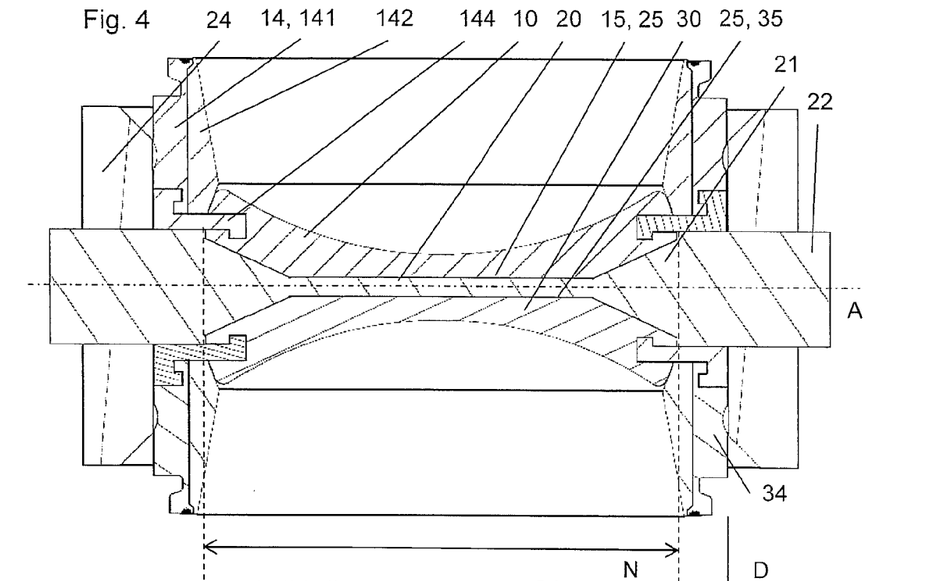
FIG. 4 shows an axial section through the multi-valve device in the closed position as shown in FIG. 1 along an axis about which the partial valves can be rotated jointly.
Figure 5:
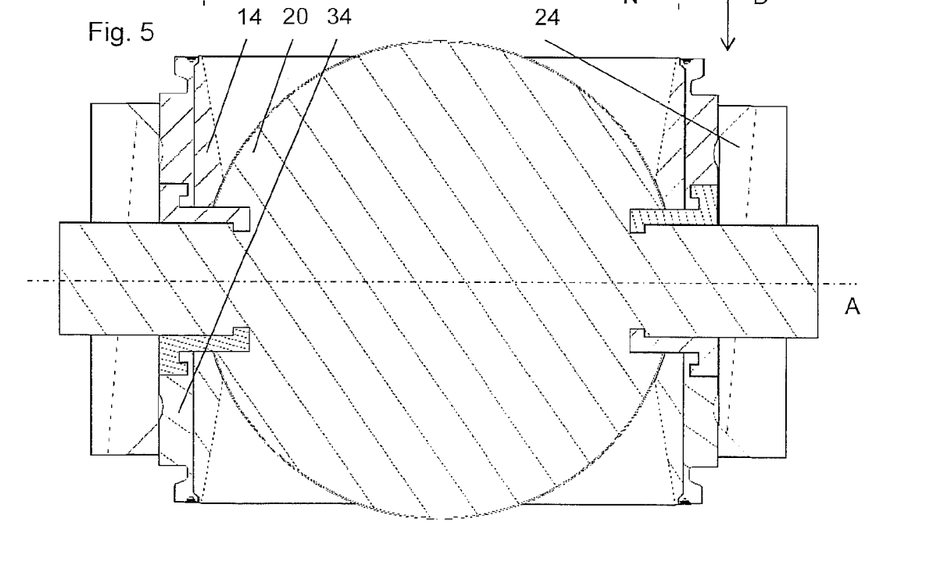
FIG. 5 shows an axial section through the multi-valve device in the open position as shown in FIG. 2 along an axis about which the partial valves can be rotated jointly.
Figure 6:
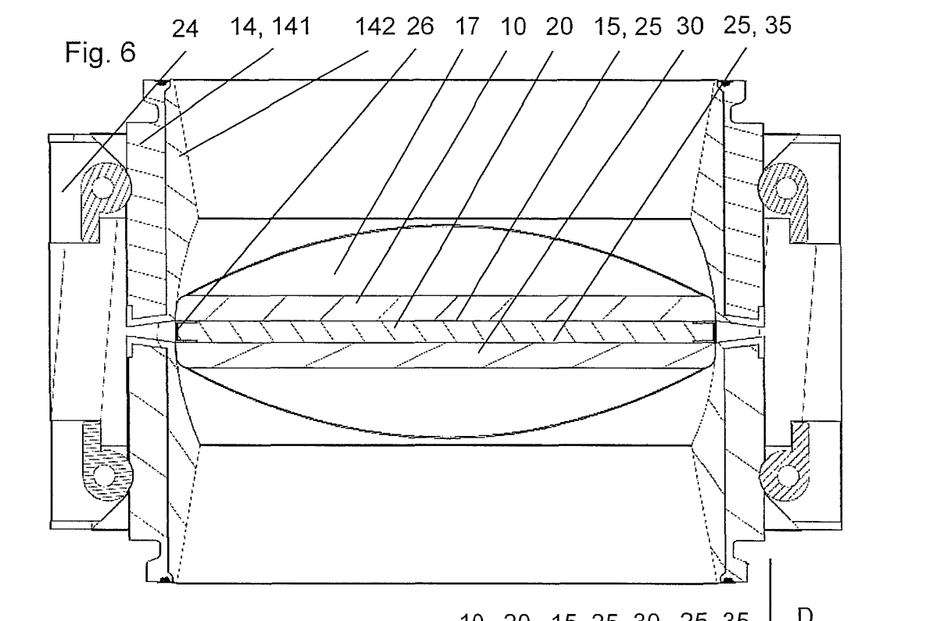
FIG. 6 shows an axial section through the multi-valve device in the closed position as shown in FIG. 1 along a line perpendicular to the axis.
Figure 7:
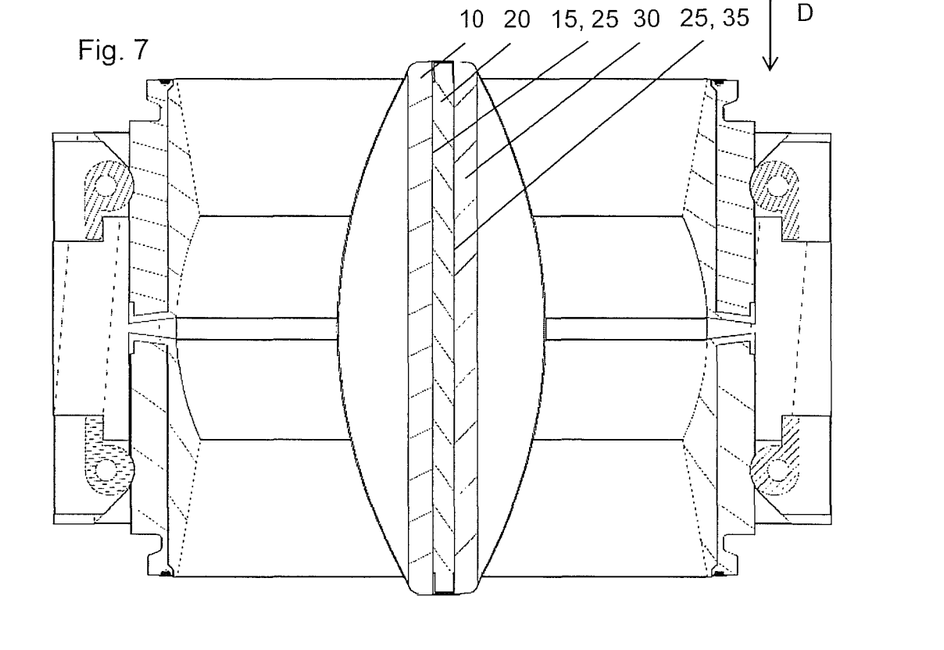
FIG. 7 shows an axial section through the multi-valve device in the open position as shown in FIG. 2.

The partial valves 10, 20, 30 are each arranged in a housing 14, 24, 34 so that they are sealed with respect to one another with the interfacial surfaces 15, 25, 35 facing one another in a docked position. FIGS. 1 and 2 show such a docked position in a perspective view in which the interfacial surfaces 15, 25, 35 have been brought into contact. In contrast with that, FIG. 3 shows an exploded view of the multi-valve device according to the invention in which the partial valves 10, 20, 30 are not in contact at their interfacial surfaces 15, 25, 35 but instead are arranged at a distance from one another and above one another in the direction of flow D. This is how a position shortly before reaching the docked position may appear.

In the exemplary embodiment of the invention shown here in FIGS. 1 and 2, three partial valves of the multi-valve device can be brought into contact with one another; these may also be referred to as one-third valves. Of the partial valves 10, 20, 30, a first partial valve 10 and a third partial valve 30 function as passive valves, while a second partial valve 20 functions as an active valve because the second partial valve 20 can be pivoted about the axis A, driven by a drive and rotatably mounted in an active housing 24. In the docked position, at least one of the passive valves is entrained by the active valve in switching from the closed position to the open position or vice versa. The multi-valve device functions even when only the active valve is docked on a single passive valve, for example, in a cleaning operation. Thus, the second passive valve is needed only in regulating operation when two drums or lines are joined to one another, each being closed with a passive valve.

As seen more clearly in FIGS. 4-7, the active second partial valve 20 has opposing pins 22, which are opposite one another as seen along the axis A and are outside of a valve plate, while also being mounted to rotate about the axis A in the active housing 24. Furthermore, the second partial valve 20 has elevations 21 along the axis A and opposite it in the area of the valve plate, intended for cooperating with interfacial surfaces 15, 35 of the first and second partial valves 10, 30 because the passive parts because the passive partial valves 10, 30 have corresponding recesses 11, 31. Such surface topographies of the interfacial surfaces 15, 25, 35 ensure that the partial valves 10, 20, 30 are centered with one another in docking and also ensure the centered position in each of the aforementioned positions of the multi-valve device.

The active plate 20 is hemmed by the active housing in the closed position, tilted to a sealing strip 26. Thusly, every interfacial surface 12, 25, 35 is hemmed by the sealing strip 26. The sealing strip 26 seals the interfacial surfaces 15, 25, 35 in each of the positions relative to one another against the material. Furthermore, the sealing strip 26 is advantageously strippable against the respective passive housing 14, 24, while the partial valves 10, 20, 30 are reaching the closed position. In the closed position the sealing strip 26 is in a compacted state between the second partial valve 20 and the active housing 24.

The active housing 24 has cams arranged opposite the axis A so that they can be swiveled toward the passive housing 14, 34 of the first and third partial valves 10, 30 in the docked position in order to apply tension to the housings 14, 24, 35 in the docked position. The cams engage in a peripheral groove in the respective passive housing 14, 34.

The design of the passive housing 14, 34 and one of the passive valves 10, 30 can be seen in FIG. 8. The passive housing 14, 34 consists of a jacket 141, which can be spread on one side and faces the active valve 20 with a receiving section 143 facing away from the respective drum and facing the active valve 20 along the direction of flow D. Slots 146 which are open at one end and are aligned along the direction of flow D are arranged in the receiving section 143 so that they pass through the jacket 141 from the outside to the inside.

A ring 142 which protrudes beyond the jacket 141 in the direction of flow D facing the active valve is accommodated in the receiving section 143, so that a sealing face is formed between the housings 14, 24, 34 and also between the jacket 141 and the passive valves 10, 30. The ring 142 has an inside surface 145 facing the first and/or third partial valves 10, 30 with which it is sealed against the first and/or third partial valves 10, 30.

The ring 142 serves not only to form a seal but also serves to secure the passive valve 10, 30 in the closed position. The ring 142 is put under tension toward the outside by the first and/or third partial valves 10, 30 when the partial valve 10, 30 is in the closed position. The ring 142 relaxes toward the inside due to its flexibility as soon as the partial valves 10, 30 are placed in the open position. A surface contour of the ring 142 can advantageously secure the partial valve in this way if the first or third partial valve 10, 30 can be pivoted out of the closed position only by overcoming a resistance. Following the ring 142 toward the outside, the receiving section 143 can also be spread outward.

The passive housing 14, 34 also has bearing shells 144, the curvature of which is formed coaxially to be both hollow cylindrical and semicylindrical with the axis A. The bearing shells 144 are opposite one another along the axis A and are accommodated in the jacket 141 as well as in the ring 142.

The active second partial valve 20 is arranged to be rotatable about the axis A by means of its pins 22 and is in contact with the passive partial valves 10, 30 at its interfacial surfaces 15, so that the partial valves can be entrained by the active partial valve 20 when switching from the closed position to the open position. The passive partial valves 10, 30 remain in position at least due to the bearing shells 144, such that the bearing shells 144 protrude into the passive partial valves 10, 30 and also into the second partial valve 20 in the open position (cf. FIG. 5). The active housing 24 also supports the pins 22 following the axis A in addition to the bearing in the bearing shells 144 and can also be rotated in connection to the bearing shells 144.

Only the passive housings 14, 34, the sealing strip 26 and the contact surfaces 17 of the first and third partial 10, 30 facing away from the interfacial surfaces 15, 35 are in contact with the material in the various positions of the multi-valve device.

Figure 9:
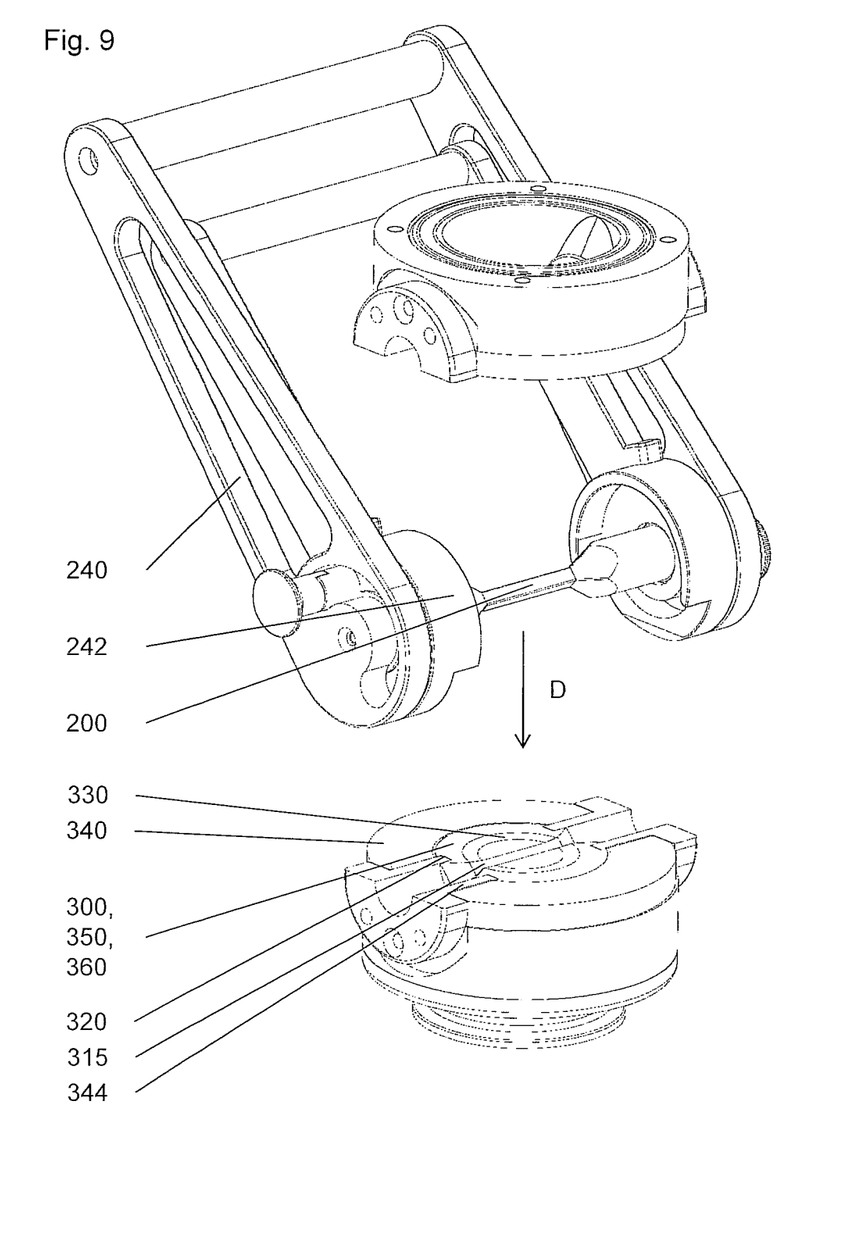
FIG. 9 shows an exploded view of a double-valve device with inventive passive valves similar to the multi-valve device shown in FIG. 3.

FIG. 9 shows an exemplary embodiment of a passive valve 300 according to the present invention. The passive valve 300 may be regarded as an alternative to the first and third partial valves 10, 30 of FIGS. 1 through 8. Instead of the second partial valve 20, now a tool 200 is arranged along the axis A which can be inserted into a longitudinal grooves 315 in the passive valve 300. The longitudinal groove 315 runs along the axis A.

The tool 200 extends as an elongated component between two operating levers 240 which are rigidly connected to one another and are intended for gripping the housing 340 of the passive valve 300 with round fittings 242 which are provided instead of an active housing. The tool 200 can be rotated about the axis A by means of the operating lever 240 and a securing device and thereby entrains the passive valve 300 when the fittings 242 are positioned according to a safety specification. For this purpose, the tool 240 has a contour whose surfaces are in contact with interfacial surfaces 350, which are congruent in at least some section in the longitudinal grooves 320 of the passive valves 300.

Half-round bearing grooves 320 are formed in the passive valve 300 opposite one another around the axis A and along the axis A, a bearing shell 344 of the housing 320 engaging in these grooves. The bearing shells 344 in this way support the passive valve 300, so that it can be rotated about the axis A in the housing 340, such that according to an advantageous embodiment, twisting is blocked until the fittings 242 have been positioned.

The interfacial surfaces 350 of the passive valves have a countersunk region 330 on the inside radially extending to a sealing surface 360 running peripherally on the outside radially. Thus the adjacent surfaces have been reduced to regions that are essential for the sealing effect. Only these regions must remain free of foreign substances to prevent them from separating.

LIST OF REFERENCE NUMERALS

10 First partial valve
11 Recess
14 Passive housing
15 Interfacial surface
17 Contact surface
20 Second partial valve
21 Elevation
22 Pin
24 Active housing
25 Interfacial surface
26 Sealing strip
30 Third partial valve
31 Recess
34 Passive housing
35 Interfacial surface
141 Jacket
142 Ring
143 Receiving section
144 Bearing shell 145 Inside surface
146 Slot
200 Tool
240 Lever
242 Fitting
300 Passive valve
315 Longitudinal groove
320 Bearing groove
330 Countersunk region
340 Housing
344 Bearing shell
350 Interfacial surface
360 Sealing surface
A Axis
D Direction of flow
N Nominal diameter.

Having described at least one of the preferred embodiments of the present invention with reference to the accompanying drawings, it is to be understood that such embodiments are merely exemplary and that the invention is not limited to those precise embodiments, and that various changes, modifications, and adaptations may be effected therein by one skilled in the art without departing from the scope or spirit of the invention as defined in the appended claims. The scope of the invention, therefore, shall be defined solely by the following claims. Further, it will be apparent to those of skill in the art that numerous changes may be made in such details without departing from the spirit and the principles of the invention. It should be appreciated that the present invention is capable of being embodied in other forms without departing from its essential characteristics.

The invention claimed is:

1. A passive partial valve assembly for multi-valve devices to seal containers or lines, said passive partial valve comprising:
    first and second housing components configured to be connected to each other with lateral seal;
    at least first and second passive partial valves positioned within said connected housing components and, said passive partial valves having a nominal diameter; and
    at least two bearing grooves configured opposite one another along an axis of said housing that are rotatable about said axis;
    wherein said at least first and second passive partial valves are rotatable about said axis in said housing to seal a container or line in a closed position along art entire circumference of said at least first and second passive partial valves and allow a fluid medium to pass through said at least first and second passive partial valves in at least one direction of flow in an open position,
    wherein said at least two bearing grooves are recessed into said passive partial valve,
    wherein said passive partial valves each have a sealing surface adjacent an interfacial surface outside of said passive partial valves for sealing with respect to said housing components, and
    wherein neither of said passive partial valves protrudes beyond said nominal diameter.

2. The passive partial valve assembly according to claim 1, further comprising:
    a longitudinal groove extending along said axis over an interfacial surface of said valve configured opposite said container or said line.

3. The passive partial valve assembly according to claim 1, further comprising:
    a countersunk region extending to a sealing surface of said valve to radially seal said interfacial surface outside said valve, wherein said countersunk region is configured opposite said container or said line.

4. A multi-valve device for a contamination-free connection of two drums or two lines, said device comprising:
    at least three partial valves arranged in parallel, configured to be put under tension to form a seal with one another, and to be rotated about a single shared axis to move from an open position to a closed position;
    wherein at least two of said at least three partial valves are passive partial valves comprising first and second housing components configured to be connected to each other with lateral seal and at least first and second partial valves positioned within said connected housing components, said passive partial valves having a nominal diameter,
    wherein said passive partial valves each have a sealing surface adjacent an interfacial surface outside of said partial valves for sealing with respect to said housing components, and
    wherein neither of said passive partial valves protrudes be said nominal diameter.

5. The multi-valve device according to claim 4, wherein said passive partial valves have opposing recesses along said axis in interfacial surfaces.

6. The multi-valve device according to claim 4, wherein said partial valves have opposing elevations along said axis on said interfacial surface.

7. The multi-valve device according to claim 4, wherein each said interfacial surface is joined on an outer facing of said housing by a sealing strip having a dimension greater than said nominal diameter of said passive partial valves in an open state.

8. The multi-valve device according to claim 4, wherein at least one of said at least three partial valves is an active valve having two opposing interfacial surfaces for surface contact with said passive partial valves and with pins configured opposite one another along said axis such that said passive partial valves are rotatable by said active valve.

9. The multi-valve device according to claim 8, wherein said housing components further comprise a jacket, and wherein said jacket farther comprises a receiving section and a ring configured to be spread and protrude beyond said jacket.

10. The multi-valve device according to claim 9, wherein said housing components further comprise continuous slots open on one end and positioned parallel to a direction of flow through said jacket.

11. The multi-valve device according to claim 10, wherein said housing components of said passive partial valves further comprise bearing shells positioned along said axis and opposite one another, and said bearing shells protruding inward to said housing components and having an inside surface shaped according to a sealing surface to grip into said passive valve and to support said passive valve in a rotatable configuration.

* * * * *